United States Patent
You

(10) Patent No.: US 8,655,541 B2
(45) Date of Patent: Feb. 18, 2014

(54) VEHICLE UPGRADE SYSTEM AND METHOD THEREOF

(75) Inventor: Sung Il You, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 88 days.

(21) Appl. No.: 13/313,759

(22) Filed: Dec. 7, 2011

(65) Prior Publication Data

US 2013/0079950 A1 Mar. 28, 2013

(30) Foreign Application Priority Data

Sep. 22, 2011 (KR) .................. 10-2011-0095827

(51) Int. Cl.
*G01M 17/00* (2006.01)
(52) U.S. Cl.
USPC .................... 701/29.1; 340/438; 717/173
(58) Field of Classification Search
USPC ............... 701/1, 29, 32; 340/438; 717/173
See application file for complete search history.

(56) References Cited

U.S. PATENT DOCUMENTS

| | | | |
|---|---|---|---|
| 2007/0185624 A1* | 8/2007 | Duddles et al. ............... | 701/1 |
| 2008/0140278 A1* | 6/2008 | Breed ........................... | 701/29 |
| 2009/0119657 A1* | 5/2009 | Link, II ........................ | 717/171 |
| 2009/0271064 A1* | 10/2009 | Enomoto et al. .............. | 701/33 |
| 2010/0082559 A1 | 4/2010 | Sumcad et al. | |
| 2010/0213891 A1* | 8/2010 | Nishikawa et al. ........... | 320/106 |
| 2011/0307882 A1* | 12/2011 | Shiba ............................ | 717/173 |
| 2011/0320089 A1* | 12/2011 | Lewis ........................... | 701/32 |
| 2013/0002415 A1* | 1/2013 | Walli et al. ................... | 340/438 |

FOREIGN PATENT DOCUMENTS

| | | |
|---|---|---|
| KR | 10-2007-0076201 | 7/2007 |
| KR | 10-2009-0063575 A | 6/2009 |
| KR | 10-2011-0043972 A | 4/2011 |

* cited by examiner

*Primary Examiner* — Thomas Black
*Assistant Examiner* — Shardul Patel
(74) *Attorney, Agent, or Firm* — Edwards Wildman Palmer LLP; Peter F. Corless

(57) ABSTRACT

A vehicle update system for updating a vehicle's ROM data is provided. More specifically, a telematics unit is configured to receive new ROM data transmitted from a telematics server. An electronic control unit (ECU) is configured first check to determine whether certain update conditions are satisfied and when they are satisfied, update the old ROM data to the new ROM data using at least one of a main battery and an auxiliary battery. More specifically, the update conditions are that the charged state and the voltage level for at least one of the main battery and the auxiliary battery is greater than a certain level, the vehicle is stopped or parked, and the controller area network (CAN) communication state of the vehicle is normal.

20 Claims, 5 Drawing Sheets

VEHICLE UPGRADE SYSTEM AND METHOD THEREOF

CROSS-REFERENCES TO RELATED APPLICATIONS

Priority to Korean patent application number 10-2011-0095827, filed on Sep. 22, 2011, which is incorporated by reference in its entirety, is claimed.

BACKGROUND OF THE INVENTION

1. Field of the Invention

The present invention relates to a system and method for upgrading a vehicle, and more particularly, to a system and method for upgrading read only memory (ROM) data of an electronic control unit of a vehicle.

2. Description of the Related Art

In a number of cases, ROM data for an electronic control unit may become degraded due to logic error or mapping problems and therefore it is necessary to update this data in order to repair the electronic control. To update the data, the consumer must visit a repair center in order for the ROM data to be repaired. Accordingly, technician repair costs are generated in order for the consumer to be supplied this update.

Therefore, it would be advantageous to be able to remotely upgrading the degraded ROM data. On concern with this approach is that if the update fails in the process of remotely upgrading ROM data, in some situations the may not be able to start their car, and thus in order for this solution to be appropriate, the system must be sufficiently stable as well.

Therefore, there is a need for a dynamic update system which can take into consideration the update environment according to the state of a vehicle to remotely update the ROM data.

SUMMARY OF THE INVENTION

The present invention has been made in view of the above problems, and provides an update system and method capable of upgrading read only memory (ROM) data of an electronic control unit according to the state of a vehicle after receiving remotely transmitted ROM data.

In accordance with an aspect of the present invention, a vehicle update system disposed in a vehicle includes: a telematics unit that receives new ROM data transmitted from a telematics server; and an electronic control unit (ECU) that updates the old ROM data to the new ROM data using power from at least one of a main battery and an auxiliary battery in case an update condition is satisfied after checking the update condition, in which the update condition is that the charged state and the voltage level for at least one of the main battery and the auxiliary battery is larger than a certain level, the vehicle is in a stopped or parked state, and the controller area network (CAN) communication state of the vehicle is normal.

In accordance with another aspect of the present invention, a vehicle update method used in a vehicle includes: receiving new ROM data transmitted from a telematics server by a telematics unit (step 1); and upgrading old ROM data to the new ROM data using power from at least one of a main battery and an auxiliary battery when update conditions are satisfied after the ECU checks the update condition (step 2), in which the update condition is that the charged state and the voltage level for at least one of the main battery and the auxiliary battery is greater than a preset level, the vehicle is in a stopped or parked state, and the controller area network (CAN) communication state is normal.

According to the present invention, when an error occurs in an electronic control unit, consumers can remotely update ROM data without visiting a repair center, and reduce the ROM data update costs. Further, according to the present invention, because the ROM data update is performed while taking into consideration the state of the vehicle, update errors which may strand a consumer may be prevented.

Further, when the update fails repeatedly, the update system can be controlled so that the update failure does not affect the operation of the vehicle by reverting the system back to the existing ROM data.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
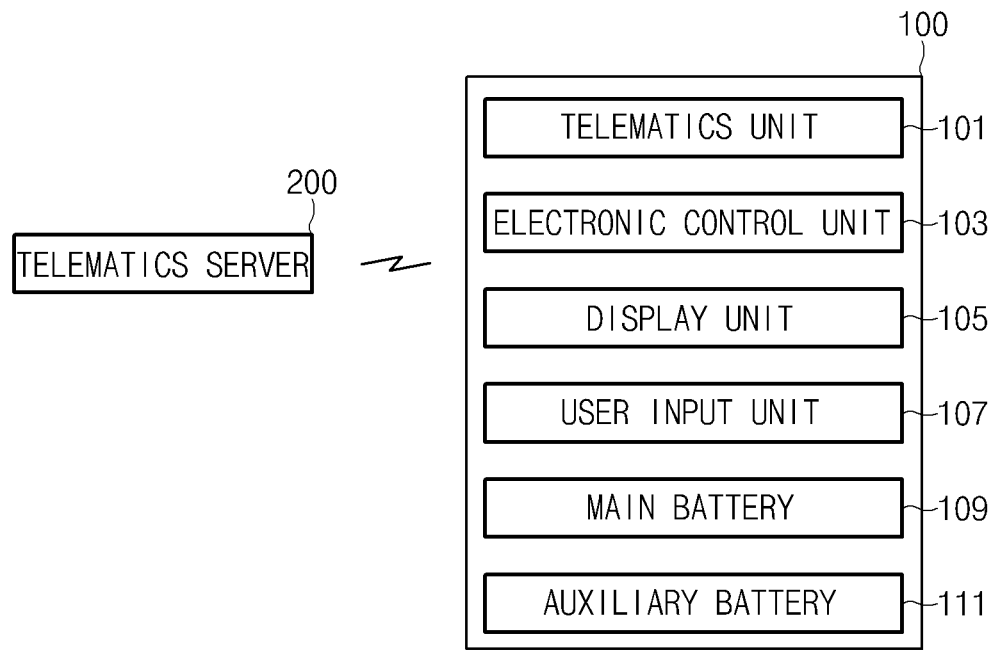
FIG. 1 illustrates a configuration of a vehicle update system according to an exemplary embodiment of the present invention.

FIG. 1 illustrates a configuration of a vehicle update system according to an exemplary embodiment of the present invention. As illustrated in FIG. 1, a vehicle update system 100 according to the present invention may include a telematics unit 101, an electronic control unit (ECU) 103, a display unit 105 and a user input unit 107. The vehicle update system 100 can perform an update using new ROM data received and transmitted from a telematics server 200.

The telematics unit 101 is a device is configured to receive transmitted new ROM data by communicating with the telematics server 200, and can determine whether a ROM ID of the current ROM data stored in the vehicle is the same as that of new ROM data transmitted from the telematics server 200 and request an update from the ECU 103, if the ROM IDs are not the same.

Further, the telematics unit 101 can periodically request that the update condition of the ECU 103 be checked. The telematics unit 101 can check the vehicle start (engine) state, and perform an update using a main battery 109 and an auxiliary battery 111. In case the vehicle start state is changed, the telematics unit 101 can inform the ECU 103 of the change of the vehicle start state. When an update is completed, an update completion message is transmitted from the ECU 103, and when the update completion message is not transmitted after a certain period of time, a restart message can be configured to be transmitted to the ECU 103.

Additionally, when update is successfully completed, the telematics unit 101 can transmit a message to the telematics server 200 which indicates that the update has completed. The ECU 103 then checks whether certain update conditions are present in the vehicle before the update is initiated, and when update conditions are satisfied, the ECU 103 updates the old ROM data using new ROM data transmitted through the telematics unit 101. The update conditions will be explained in detail with reference to FIG. 2.

Furthermore, the ECU 103 can periodically check the update conditions and can check the update conditions even while the update is being performed, and if the update conditions are not satisfied, the ECU 130 can stop performing the update accordingly.

Once the update is successfully completed, the ECU 103 transmits the update completion message to the telematics unit 101. When, however, a restart message is transmitted from the telematics unit 101, an update is again initiated using new ROM data received in the transmitted restart message. The ECU 103 may be configured to check the number of times the restart message has been transmitted by the telematics unit 101.

Therefore, when the transmission count is less than a preset number, the update is repeatedly performed using the new ROM data. Once, however, the transmission count is equal to a preset number, the update is performed using the original ROM data thereby reverting the ECU back to its original state. When the update performed using the old/original ROM data also fails and the transmission count is greater than the preset number, the update is terminated, and the battery used for powering the update is turned off. Therefore, even when an error occurs while the update is being performed, the ECU 103 can appropriately respond to the error, and when the update finally fails, unnecessary battery discharge can be prevented by turning off the battery accordingly. Here, the preset number can be set by the user to be, for example, 3, 5, or any other number which would prevent the battery from being completely discharged due to continuous failure of the updating system.

Further, when the ROM data update is terminated, the ECU resets the state of the ECU 103 by turning off the engine of the vehicle and then starting the engine again, or when the vehicle engine has already been turned off, the ECU resets the state of the ECU 103 by starting the engine briefly. It is, also, possible to determine whether the updated ROM data is normally operating by resetting the state of the ECU 103.

The display unit 105 is a device that indicates the current state of a vehicle, whether the ROM data update is performed, whether the ROM data update has been successfully performed, a change of the vehicle start state during the ROM data update, and/or an error generation during the ROM data update, etc.

The user input unit 107 is a device configured to accept and generate a signal from a user selection, and can be implemented as one device along with the display unit 105. For example, the start, stop and termination of the ROM data update can be manually selected through the user input unit 107.

The main battery 109 and the auxiliary battery 111 are installed in a vehicle, and can supply power to the ECU and other associated device when the ECU 103 performs an update. When the vehicle engine has been turned on, the ECU 103 uses the main battery 109, and when the vehicle engine has been turned off, the ECU 103 can be configured to use the auxiliary battery 111.

Figure 2:
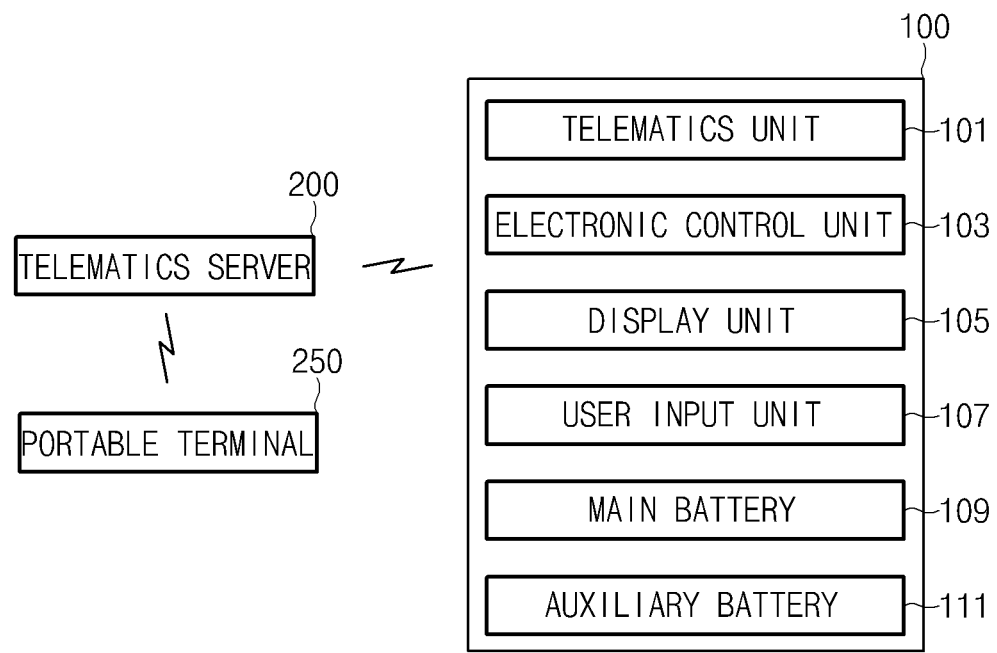
FIG. 2 illustrates a configuration of a vehicle update system according to another exemplary embodiment of the present invention.

FIG. 2 illustrates a configuration of a vehicle update system according to another exemplary embodiment of the present invention. The vehicle update system 100 illustrated in FIG. 2 receives new ROM data transmitted from the telematics server 200, and updates ROM data as illustrated in FIG. 1.

The telematics server 200 stores new ROM data distributed from users or vehicle manufacturers, and transmits the new ROM data to the telematics unit 101 in the vehicle. The telematics server 200 can check whether the new ROM data is associated with the vehicle by transmitting to the telematics unit 101 a ROM ID with the new ROM data before the new ROM data is updated on the ECU. A method of authenticating the ROM ID of the new ROM data is explained in detail with reference to FIG. 3.

In the illustrative embodiment of the present invention, the telematics server can be configured to transmit the new ROM data only when a transmission request is generated by and sent by the telematics unit 101. Alternatively, the telematics server 200 may also be configured to periodically transmit the new ROM data to the telematics unit 101 without any such request or when a request has not been requested after a certain period of time has passed.

However, if a transmission request is generated from a portable terminal 250, the telematics server 200 can transmit new ROM data to the telematics unit 101. Therefore, new ROM data may be transmitted according to user's request transmitted through the portable terminal 250.

In more detail, the ECU 103 of the vehicle update system 100 can perform a ROM data update only when certain update conditions are satisfied as explained with reference to FIG. 1. Here, the update conditions refer to when the main battery 109 or auxiliary battery 111 is completely charged or the voltage level for the main battery 109 or the auxiliary battery 111 is greater than a predetermined level, the vehicle is in a stopped or parked state, and the vehicle's controller area network (CAN) communication state is normal.

When the battery's charged state is not sufficient or the voltage level is too low, there is a high chance that the update will fail. Accordingly, the ECU 103 can check the battery's charge state or voltage level using a battery sensor, etc. and check whether this particular update condition is satisfied. For example, when the charged state of the battery is less than 20% of the entire battery capacity, it can be determined that this particular update condition is not satisfied.

Furthermore, because an error generated in the ROM data can affect the engine's ability start the vehicle, the ROM data update is performed only when the vehicle is stopped and/or parked. To do this, ECU 103 may for example, check whether the gear is in neutral or in a parking state, or whether the vehicle speed is zero from the vehicle speed sensor in order to determine whether this particular update condition is satisfied.

Also, because the ROM data update is performed through a CAN communication between the telematics unit 101 and the ECU 103, when a disconnection, short circuit or unstable signal, etc. of the CAN communication line is generated, the ROM data update cannot be performed. Therefore, the CAN network is checked to determine whether the update condition is satisfied by checking whether the CAN communication line is normal.

Advantageously, even when the vehicle engine is turned off, it is possible to update the ROM data using the auxiliary battery, and thus determining whether the engine is turned on or off is not an update condition. However, when the engine state is changed while the ROM data is updated, that is, when the engine state is changed from the on to off or from off to on, the ECU 103 should recheck the update conditions in response to this change because, when the vehicle start state is changed, the devices operated in the vehicle can be changed, or the battery state of the vehicle can be changed because of the increase number of operated devices.

Figure 3:
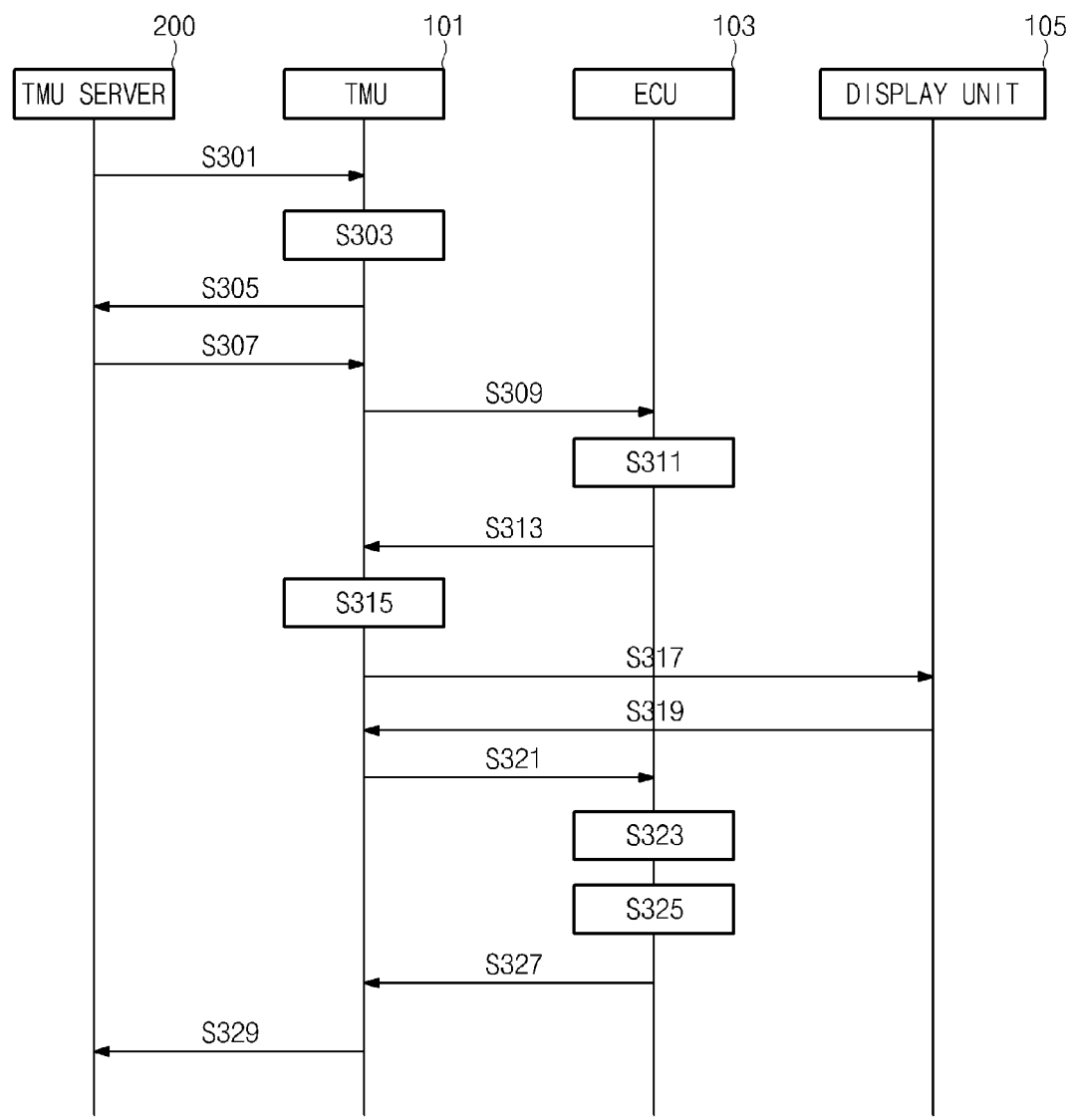
FIG. 3 is a flowchart illustrating a method of upgrading a vehicle according to an exemplary embodiment of the present invention.

FIG. 3 is a flowchart illustrating a method of upgrading a vehicle according to an exemplary embodiment of the present invention. As illustrated in FIG. 3, first, the telematics sever 200, which stores new ROM data, transmits a ROM ID of new ROM data to the telematics unit 101 (301). The telematics unit 101 compares the ROM ID of the current ROM data used in the ECU 103 with the ROM ID of the new ROM data transmitted from the telematics server 200 (303). As a result of the comparison at step 303, when the ROM ID of the current ROM data is the same as the ROM ID of the new ROM data, the telematics unit 101 transmits the ROM ID confirmation message to the telematics server 200 (305), and the telematics server 200, which received the transmitted confirmation message, transmits the new ROM data to the telematics unit 101 (307).

Next, the telematics unit 101, which received the transmitted new ROM data, requests that the ECU 103 check to make sure that the update conditions are satisfied. The telematics unit 101 can periodically send a request to check the update conditions as well. The ECU 103, then checks the update conditions (311), and when the update conditions are satisfied, the ECU 103 transmits an update preparation completion message to the telematics unit 101 (313).

The telematics unit 101, receives the transmitted update preparation completion message, checks the vehicle start state, and determines whether to use the main battery 109 or the auxiliary battery 111 according to the vehicle start state (315). Further, the telematics unit 101 can display a check image to ask whether to perform the update through the display unit 105 (317), and when the user's selection signal for the check image is inputted through the user input unit 107 coupled with the display unit 105, the telematics unit 101 can receive the transmitted user's selection signal (319) accordingly.

The telematics unit 101 requests the ROM data update to the ECU 103 (321). Here, the telematics unit 101 does not need to be the device that receives the transmitted user's selection signal, and can request the ROM data update to the ECU 103 periodically or alternatively, when a problem occurs in the ROM data of the ECU 103.

Subsequently, the ECU 103 performs the ROM data update (323). If, however, the ROM data update is terminated, the ECU 103 resets the state of the ECU 103 (325). As a result of resetting the state of the ECU 103, when the vehicle normally starts and the ROM data update has been successfully terminated, the ECU 103 transmits an update completion message to the telematics unit 101 (327).

The telematics unit 101 receives the update completion message, transmits a message, which informs the telematics server 200 that the update has completed successfully (329).

Figure 4:
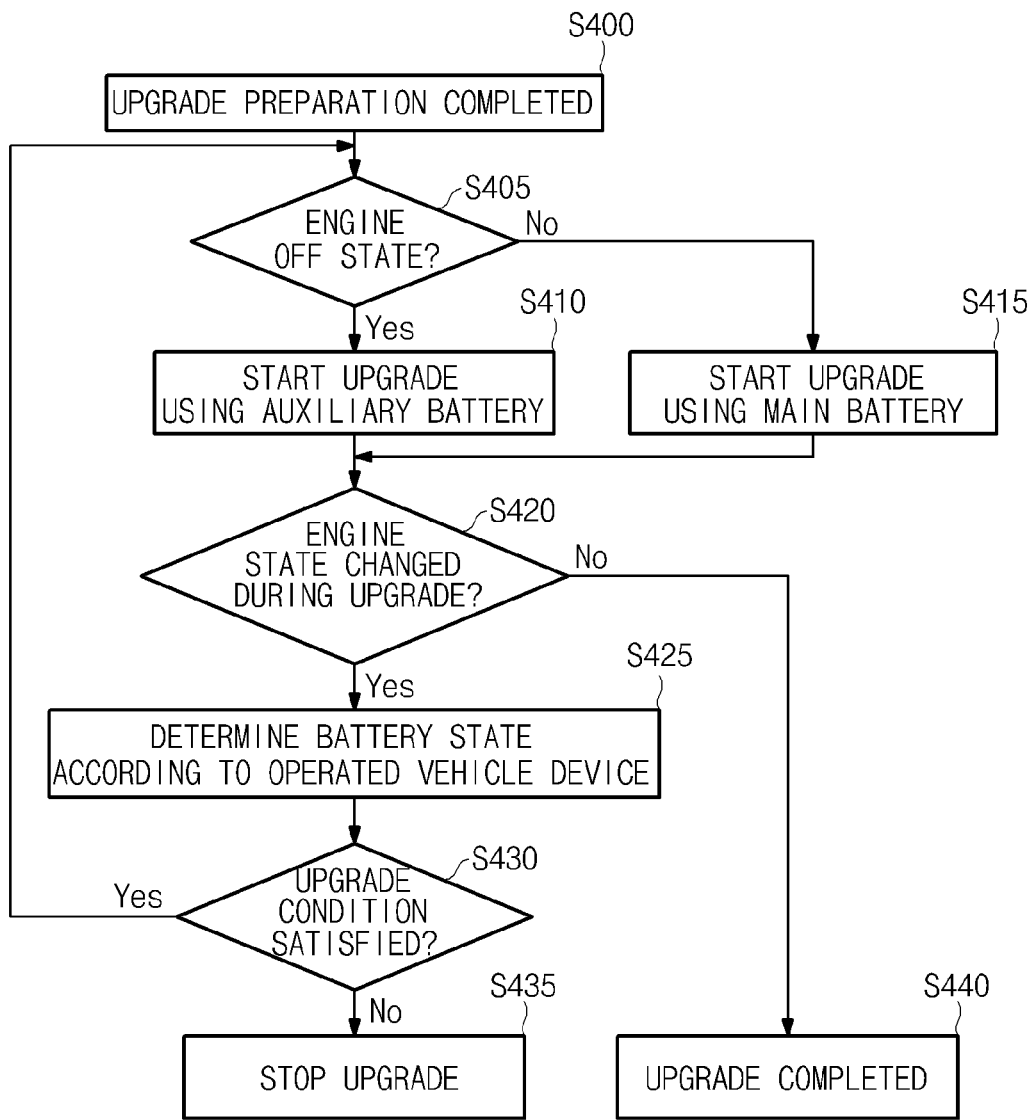
FIG. 4 is a flowchart illustrating an update method according to the start state of a vehicle as illustrated in FIG. 3.

FIG. 4 is a flowchart illustrating an update method according to the start state of a vehicle as illustrated in FIG. 3. FIG. 4 illustrates step 315 explained with reference to FIG. 3, that is, an update method according to the vehicle start state, in detail. As illustrated in FIG. 4, as a result of checking the update condition of the ECU 103, when the update is satisfied, an update preparation completion message is transmitted (400). Thereafter, the telematics unit 101 checks whether the vehicle engine is off (405), and when the engine is off, the ECU 103 starts the update using power supplied from the auxiliary battery 111 (410), and if the engine is on, the ECU 103 starts the update using power supplied from the main battery 109 (415).

Thereafter, while the update is being performed, the telematics unit 101 determines whether the vehicle start (engine) state has changed (420), and if the vehicle start state is changed, the ECU 103 checks the state of the battery according to the device of vehicle which is operated as the vehicle start state is changed (425). When the vehicle start state is changed, the ECU 103 checks the update condition again/repetitively. Further, however, if the vehicle start state is not changed, the update is continued and completed (440) without further monitoring of the update conditions.

The ECU 103 determines whether the state of the vehicle checked at step 425 satisfies the update condition (430), and in case the update condition is satisfied, the telematics unit 101 determines which battery will be used to continue the update by checking the current vehicle start (engine) state (405).

As a result of determination at step 430, in case the update condition is not satisfied, the telematics unit 101 stops the update (435).

Figure 5:
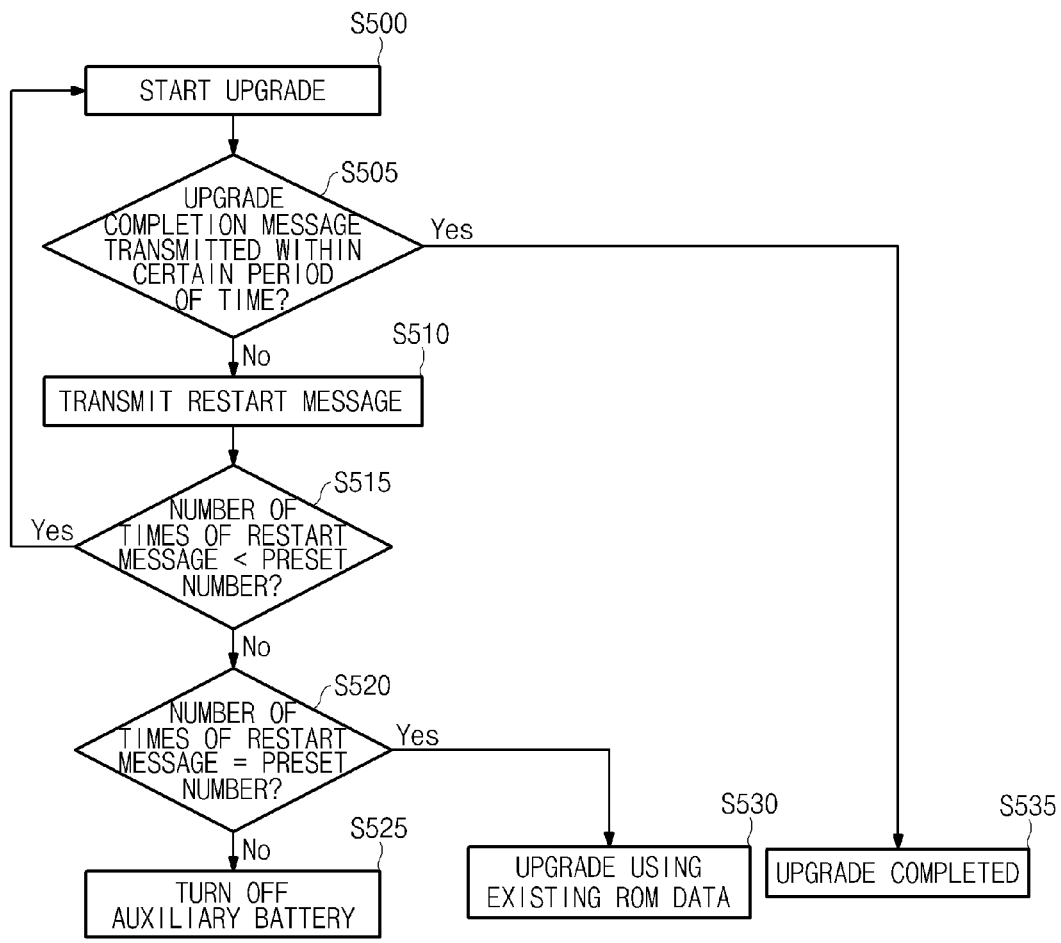
FIG. 5 is a flowchart illustrating an update method according to repeated update failures as illustrated in FIG. 3.

FIG. 5 is a flowchart illustrating an update method according to repeated update failures as illustrated in FIG. 3.

FIG. 5 illustrates a method of performing an update according to an update failure in case a vehicle engine is turned off at step 323 explained with reference to FIG. 3 in detail. In case the vehicle engine is turned off, repeated update attempts unnecessarily discharge the battery.

As illustrated in FIG. 5, the ECU 103 receives power supplied from the auxiliary battery 111, and starts the update using new ROM data (500).

The telematics unit 101 determines whether the update completion message is transmitted from the ECU within a certain period of time (505). In case the update completion message is transmitted, the transmission shows that the ROM data update has been successfully completed (535).

When an update completion message is not transmitted, the telematics unit 101 transmits a restart message to the ECU 103 (510). The ECU 103, which receives the transmitted restart message, counts the number of times a restart message has been transmitted and determines whether the transmission count is less than a preset number (515), and if the transmission count is less than the preset number, the update is restarted using the new ROM data (500). When, however, it is determined that the transmission count, the update is performed using the old ROM data (530), thereby reverting the system back to its original composition.

Additionally, when the transmission count is greater than the preset number and the update using the old ROM data has failed as well, the ECU 103 turns off the auxiliary battery 111 (525) so that the auxiliary battery is not drained.

Therefore, even when an error occurs in the ROM data update while the engine is turned off, the update is repeated for an appropriate number of times using new ROM data, and the old ROM data is used as a last attempt to restore the system. Even if, however, the old ROM data cannot be restored, the present invention advantageously turns off the auxiliary battery and thus the auxiliary battery can be prevented from being drained.

The present invention may be implemented in an executable program command form by various computer means, e.g., a controller, a processor or the like and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A vehicle update system for updating a vehicle, the system comprising:
    a telematics unit that receives new ROM data transmitted from a telematics server;
    an electronic control unit (ECU) configured to check that certain update conditions are satisfied and when the certain update conditions are satisfied, update old ROM data to the new ROM data;
    a main battery configured to provide power to update the old ROM data to the new ROM data when the vehicle engine is on; and
    an auxiliary battery configured to provide power to the ECU update the old ROM data to the new ROM data when the vehicle engine is off,
    wherein the update condition is that the charged state and the voltage level for at least one of the main battery and the auxiliary battery is larger than a certain level, the vehicle is in a stopped or parked state, and the controller area network (CAN) communication state of the vehicle is normal.

2. The system of claim 1, wherein the telematics unit receives the new ROM data transmitted from the telematics server only when a first ROM ID of the old ROM data is the same as a second ROM ID of the new ROM data.

3. The system of claim 1, wherein the telematics server transmits the new ROM data to the telematics unit when a request for the new ROM data is transmitted from the portable terminal.

4. The system of claim 1, wherein the ECU stops the update when the update conditions are not satisfied.

5. The system of claim 1, wherein the telematics unit periodically requests checking the update condition to the ECU.

6. The system of claim 1, wherein the ECU rechecks the update condition when the vehicle engine state is changed while the update is being performed.

7. The system of claim 1, wherein the ECU transmits an update completion message to the telematics unit when the update is completed.

8. The system of claim 7, wherein the telematics unit transmits a restart message to the ECU when the update completion message is not transmitted to the telematics unit within a certain period of time.

9. The system of claim 8, wherein the ECU performs an update using the new ROM data associated with the restart message when a transmission count relating to a number of times the restart message is sent is smaller than a preset number.

10. The system of claim 8, wherein the ECU performs an update using the old ROM data when a transmission count relating to a number of times the restart message is sent is the same as the preset number.

11. The system of claim 8, wherein the ECU turns off the auxiliary battery when the vehicle engine is off and a transmission count relating to a number of times the restart message is sent is greater than the preset number.

12. The system of claim 1, wherein the ECU resets the state of the ECU after the update is completed.

13. A vehicle update method used in a vehicle, the method comprising:
    receiving new ROM data transmitted from a telematics server by a telematics unit (step 1);
    checking, by an electronic control unit (ECU), whether certain update conditions are satisfied; and
    when the update conditions are satisfied, updating old ROM data to the new ROM data using at least one of a main battery and an auxiliary battery (step 2),
    wherein the update conditions are that the charged state and the voltage level for at least one of the main battery and the auxiliary battery is greater than a preset level, the vehicle is stopped or parked, and the controller area network (CAN) communication state is normal, and
    wherein the ECU performs the update using the auxiliary battery when the vehicle engine is off, and performs the update using the main battery when the vehicle engine is on.

14. The method of claim 13, wherein step 1 is performed when a first ROM ID of the old ROM data is the same as a second ROM ID of the new ROM data.

15. The method of claim 13, wherein step 1 is performed when a request for the new ROM data is transmitted from a portable terminal to the telematics server.

16. The method of claim 13, further comprising:
    rechecking the update conditions by the ECU when the vehicle engine state is changed while the update is being performed (step 3).

17. The method of claim 13, further comprising:
    transmitting a restart message to the ECU by the telematics unit if an update completion message, which the ECU transmits to the telematics unit, is not transmitted within a certain period of time after the update is completed (step 4).

18. The method of claim 17, further comprising:
    performing an update using the new ROM data associated with the restart message by the ECU when a transmission count relating to a number of times the restart message is sent is less than a preset number (step 5).

19. The method of claim 17, further comprising:
performing an update using the old ROM data by the ECU when a transmission count relating to a number of times the restart message is sent is the same as the preset number (step 6).

20. A non-transitory computer readable recording medium containing executable program instructions executed by a processor, comprising:
program instructions that receive and translate new ROM data transmitted from a telematics server by a telematics unit;
program instructions that check whether certain update conditions are satisfied; and
program instructions update old ROM data to the new ROM data using at least one of a main battery and an auxiliary battery when certain update conditions are satisfied,
wherein the update conditions are that the charged state and the voltage level for at least one of the main battery and the auxiliary battery is greater than a preset level, the vehicle is stopped or parked, and the controller area network (CAN) communication state is normal, and
wherein the ECU performs the update using the auxiliary battery when the vehicle engine is off, and performs the update using the main battery when the vehicle engine is on.

* * * * *